3,129,263
PREPARATION OF HYDRAZINE DERIVATIVES
Julian Feldman and Orville D. Frampton, Cincinnati, Ohio, assignors, by mesne assignments, to FMC Corporation, New York, N.Y., a corporation of Delaware
No Drawing. Filed Nov. 21, 1958, Ser. No. 775,353
4 Claims. (Cl. 260—583)

This invention relates to a process for the preparation of hydrazine derivatives and particularly to an improved method of preparing hydrazine derivatives by the catalytic hydrogenation of the corresponding nitrosoamines.

Hydrazine and dialkylhydrazines have found application as reducing agents, antioxidants, chlorine and oxygen scavengers, and chemical intermediates. Recently dimethylhydrazine has become important in the rocket fuel field, possessing some advantages over hydrazine itself in this use. It has recently been proposed that unsymmetrical dialkylhydrazines can be prepared by the catalytic hydrogenation of N-nitrosodialkylamines. The proposed process, however, has been found to possess several disadvantages, such as a drop-off in catalyst activity and a lack of selectivity of the reduction reaction for producing the desired hydrazine derivative. Since catalyst cost depends not only upon the initial cost of the fresh catalyst and upon the recovery cost of the spent catalyst, but also upon the catalyst life, the activity of used catalyst is an important factor economically.

One object of this invention is to provide a process for the preparation of hydrazine derivatives which avoids the disadvantages of the prior art processes. Another object is to provide a process for the catalytic reduction of N-nitrosodimethylamine to unsymmetrical dimethylhydrazine with a minimum of side reactions and with a maximum amount of catalyst reusage. Still further objects and advantages of the present invention will appear from the more detailed description set forth below.

In accordance with the present invention, it has now been discovered that the reduction reaction, the separation of the product from the catalyst, and the reuse of the catalyst are all adversely affected by the presence of oxygen-containing gases. In general, the present invention comprises hydrogenating a nitrosoamine in the presence of a catalyst, separating the resulting hydrazine derivative and reaction by-products, if any, from the catalyst, and then recycling the catalyst for reuse; all of these steps being conducted in the substantial absence of an oxygen-containing gas. The overall reaction is as follows:

wherein R and R' are the same or different straight or branched chain alkyl, aryl, alkylaryl, heterocyclic groups having from about 1 to 24, and preferably about 1 to 6 carbon atoms, which include methyl, ethyl, n-propyl, isopropyl, n-butyl, isobutyl, tertiary butyl, the various pentyls, cyclohexyl, phenyl and so forth. The groups may also contain functional groups such as hydroxyl, amino, imino, ether, carboxyl or any other group which does not interfere with the reaction. Specific examples of such nitrosoamines are N-nitrosodimethylamine, N-nitrosodipropylamine, N-nitrosodibutylamine, N-nitrosomethylethylamine, N-nitrosodiamylamine, N-nitrosomethylcyclohexylamine, N-nitrosodicyclohexylamine, N-nitrosobis(abietyl)amine, N-nitrosodistearylamine, N-nitrosodiphenylamine, and the like.

The loss in catalyst activity during reuse which results from contamination with oxygen is also accompanied by a loss in selectivity for producing unsymmetrical dialkylhydrazine in preference to the unwanted by-products, e.g., dimethylamine and ammonia as in the reduction of N-nitrosodimethylamine, and diphenylamine and nitrogen as in the reduction of N-nitrosodiphenylamine, which form when the nitrosoamine is reductively cleaved:

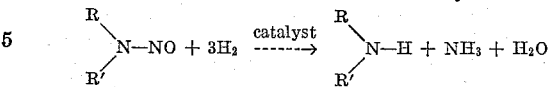

It is hence desirable that the process of this invention be carried out in such a way that contamination with oxygen be avoided. Among the points in the process that oxygen contamination may occur are the following: in the feed material or substrate, the catalyst, the hydrogenation zone, the catalyst recovery and recycling system, the catalyst make-up and wash waters, etc. The technique that is employed to avoid contamination with oxygen varies with the particular step. For example, oxygen contamination in the substrate may be avoided by preparing it under an inert atmosphere. The catalyst may be protected by purging it with nitrogen or other inert gas, while the hydrogenation reaction is carried out in a sealed reaction vessel under a flow of nitrogen, etc. The product may be removed from the reaction vessel by suction, the catalyst washed and backflushed off the filter by suction, all of these steps being carried out under an inert atmosphere. The make-up water and the wash water are, for example, boiled and then cooled under nitrogen. The catalyst may also be prepared in the absence of oxygen. Other methods of accomplishing this result will readily suggest themselves to one skilled in the art.

The catalyst may be any one or a combination of the group VIII metal catalysts, such as palladium, rhodium, platinum, and so forth. It will be understood that the catalyst may be used as such or it may be supported on a conventional inert material, such as carbon, charcoal, silica gel, barium sulfate, alumina, and the like. Palladium supported on carbon is especially preferred as the catalyst for the process of this invention.

Although a solvent is not essential, it is preferred that the reaction be carried out in the presence of a liquid which is inert with respect to both the nitrosoamine and the resulting hydrazine derivative. When possible, it is preferred that the reaction be conducted in an aqueous medium.

A wide variety of hydrazine derivatives corresponding to the starting nitrosoamines may be produced readily by this catalytic hydrogenation process, the preferred product being aliphatic hydrazines, especially of the unsymmetrical type, and having the general formula

wherein R and R' are those groups specified above. One particularly desired derivative is unsymmetrical dimethylhydrazine.

In accordance with another aspect of the present invention, it has been found that particularly outstanding results can be achieved by utilizing certain specific operating conditions. The operating temperature is within the range of about 0° to about 60° C. and is preferably between about 10° and 30° C. The catalyst may be present in an amount equivalent to about 0.01 to about 10 percent of metal based on the weight of the nitrosoamine, and preferably between about 0.05 and 1 percent. Other important operating conditions include hydrogen pressure, which will range from about 0 to about 1000 p.s.i.g., preferably from about 165 to about 300 p.s.i.g., and water concentration, which may be between 0 and 80 percent, preferably between about 20 to 40 percent.

In the following tables examples are given to illustrate various embodiments of the invention and to demonstrate the importance of controlling the amount of catalyst, the temperature, and the pressure employed. These examples are intended in no way to limit this invention except in accord with the appended claims. In general, the supported palladium catalyst, N-nitrosodimethylamine, and water were charged to a 250 ml. 316 stainless steel Magnadash autoclave. The bomb head was then attached. The bomb was flushed first with nitrogen, then with hydrogen, and then pressured with hydrogen. The bomb was quickly repressured each time after the pressure dropped 60 to 80 p.s.i. during hydrogenation. At the completion of the run, the pressure was gradually released. The bomb was flushed with nitrogen and then disassembled.

In Table I, the effect of certain operating conditions on yields are demonstrated using a palladium on carbon catalyst and N-nitrosodimethylamine as the feed material. The reduction was carried out in the absence of any oxygen-containing gases.

*Table I*

| Exps. | N-Nitrosodimethylamine (ml.) | Catalyst Conc. (Wt. percent) | Press. (p.s.i.g.) | Temp. (° C.) | Water Conc. (percent) | Unsym. Dimethylhydrazine (percent) | UDMH/DMA [1] Ratio |
|---|---|---|---|---|---|---|---|
| 1 | 10 | 0.0114 | 300 | 26 | 80 | 80.5 | 5.16 |
| 2 | 10 | 0.0720 | 300 | 26 | 80 | 96.0 | 32.0 |
| 3 | 10 | 0.0722 | 300 | 0 | 80 | 92.5 | 46.2 |
| 4 | 10 | 0.0726 | 300 | 26 | 80 | 92.5 | 20.1 |
| 5 | 10 | 0.0719 | 300 | 90 | 80 | 71.1 | 3.07 |
| 6 [2] | 50 | 0.0361 | 300 | 26 | 0 | 87.5 | 12.8 |
| 7 [2] | 40 | 0.0360 | 300 | 26 | 20 | 87.5 | 16.4 |
| 8 [2] | 20 | 0.0359 | 300 | 26 | 60 | 87.0 | 11.2 |

[1] Unsym. Dimethylhydrazine/Dimethylamine yield ratio.
[2] Lower catalyst concentrations were used in these examples in order to better study the effect of water concentration.

In Table II the effect of excluding oxygen gas contamination from various points in the process is demonstrated. The feed material was N-nitrosodimethylamine, and the catalyst used was 5% palladium on carbon, the same as in the examples of Table I. The average hydrogen pressure was 300 p.s.i.g., and the reaction temperature was 26° C. 10 ml. of N-nitrosodimethylamine was used per charge with a water concentration of 80%, unless otherwise indicated.

*Table II*

| Exps. | Catalyst Conc. (Wt. percent) | UDMH yield (percent) | UDMH/DMA Ratio | Operation for Exclusion of Oxygen |
|---|---|---|---|---|
| 9 | 0.07195 | 85.32 | 13.59 | NDMA amounting to 1% of usual charge added to catalyst and make-up water and hydrogenated. Substrate then added anaerobically and hydrogenated. Make-up water not treated to remove dissolved air. |
| 10 | 0.0726 | 66.38 | 3.23 | Oxygen bubbled through suspension of catalyst in oxygen-saturated make-up water containing 1% of reduced NDMA mixture. NDMA added and hydrogenated. |
| 11 | 0.0716 | 75.46 | 8.60 | 1st use—Make-up water boiled and cooled under nitrogen. |
|  |  | 51.15 | 1.21 | 2nd use—Hydrogenated slurry then filtered in air allowing to pass through filter, thus exposing catalyst and reduction products to oxygen. Catalyst waterwashed, then suspended in water, and air bubbled through suspension. |
| 12 | 0.0720 | 88.67 | 27.40 | 1st use—Air excluded from make-up water, catalyst wash water, and during filtration at end of experiment. 20% H₂O. |
|  |  | [1] 95.25 | 24.67 | 2nd use—Air excluded from make-up water. 20% H₂O. |
| 13 | 0.0716 | 86.45 | 13.48 | 1st use—Boiled pure substrate to exclude oxygen. |
|  |  | 89.03 | 15.46 | 2nd use—Make-up water boiled and cooled under nitrogen. Reuse of catalyst carried out under anaerobic conditions. |
|  |  | 88.04 | 11.97 | 3rd use—Same as for 2nd use. |

[1] A minor amount of this yield was unrecovered product from 1st. use.

The above data show that the exclusion of oxygen gas from the process of preparing hydrazine derivatives from the catalytic hydrogenation of substituted nitrosoamines is important in obtaining high yields and in effectively re-using the catalyst without lowering yields of the desired product below economical levels. The data in Table I show that operating conditions such as temperature, catalyst concentration, water concentration are also important in achieving outstanding yields of hydrazine derivatives.

It will be understood that the foregoing examples are not intended to limit the invention to the feed materials and conditions disclosed therein. The invention may be varied within the limits disclosed above without departing from its broader aspects.

What is claimed is:

1. A process for the preparation of unsymmetrical dimethylhydrazine which comprises reacting nitrosodimethylamine with hydrogen in the presence of a palladium catalyst at a temperature below about 60° C. and separating said catalyst from the resulting reaction product mixture, said reaction being conducted in the presence of deaerated water in an amount up to about 80%.

2. Process of claim 1 in which the palladium catalyst is present in the amount of about 0.5 to 1%.

3. Process of claim 1 in which said palladium catalyst is supported on carbon.

4. Process of claim 1 in which said palladium catalyst is recycled to said reaction zone without contacting oxygen gas.

References Cited in the file of this patent

UNITED STATES PATENTS

| 2,166,152 | Howk | July 18, 1939 |
| 2,166,183 | Signiago | July 18, 1939 |
| 2,768,878 | Passino | Oct. 30, 1956 |

FOREIGN PATENTS

| 797,483 | Great Britain | July 2, 1958 |
| 1,037,464 | Germany | Aug. 28, 1958 |
| 1,160,629 | France | Mar. 3, 1958 |

OTHER REFERENCES

Paal et al.: Berichte Deut. Chem., vol. 63, pp. 56–66 (1930).

Berkman et al.: "Catalysis," p. 372 (1940).